United States Patent [19]

Scott et al.

[11] Patent Number: 4,790,685
[45] Date of Patent: Dec. 13, 1988

[54] SHORELINE BREAKWATER FOR COASTAL WATERS

[76] Inventors: Thomas P. Scott, P.O. Box 234, Tice, Fla. 33905; Jerry Todd, Sr., 513 SE. 24th Ave., Apartment 4, Cape Coral, Fla. 33904

[21] Appl. No.: 3,475

[22] Filed: Jan. 15, 1987

Related U.S. Application Data

[63] Continuation of Ser. No. 868,326, May 28, 1986.

[51] Int. Cl.⁴ ............................................... E02B 3/04
[52] U.S. Cl. ........................................ 405/30; 405/21; 405/25
[58] Field of Search .................................. 405/21–28, 405/30–35, 15, 16, 29

[56] References Cited

U.S. PATENT DOCUMENTS

| | | | |
|---|---|---|---|
| 1,816,095 | 7/1931 | Stanford | 405/25 |
| 2,069,715 | 2/1937 | Arpin | 405/25 |
| 3,851,476 | 12/1974 | Edwards | 405/25 |
| 4,502,816 | 3/1985 | Creter et al. | 405/25 X |

FOREIGN PATENT DOCUMENTS 8005158  4/1982  Netherlands ........................ 405/25

Primary Examiner—Dennis L. Taylor
Attorney, Agent, or Firm—Alfred E. Wilson

[57] ABSTRACT

As civilization progresses people have a desire to build their homes as close as possible to the ocean and other coastal waters. Due primarily to the attraction of the moon, the ocean's shoreline moves regularly between high and low tide elevations, referred to as the foreshore area. Beyond the foreshore area there are successive areas identified as the trough and the bar areas resulting from the turbulence caused as the incoming waves reach the shallower waters as they approach the foreshore area. The tidal movement of the water, coupled with periodic storm surges causes dramatic shifting of the shoreline, frequently with disasterous results. Concerted efforts have been made to overcome this serious condition, but without marked success. We have devised a system whereby erosion can be prevented. We provide an artificial reef positioned in the submarine beach area, an area in the water that is shallow at low tide and is out beyond the foreshore area and the trough and the bar areas. We place a continuous triangular so-called sea-lift in the submarine beach area to deflect upwardly and slow down the incoming waves to form new trough and bar areas beyond the foreshore area and to shift the foreshore area outwardly. If desired the newly formed beach in the low tide area can be shifted inwardly on the beach by earth moving equipment to increase the useable beach area.

3 Claims, 3 Drawing Sheets

SHORELINE BREAKWATER FOR COASTAL WATERS

PREVIOUSLY FILED APPLICATION

This application is a continuation of our previously filed and now pending patent application Ser. No. 868,326 filed May 28, 1986.

BACKGROUND OF THE INVENTION

Due to the regular recurrence of the tides, as augmented by the forces exerted by periodic storms, big changes have been made in the contour of ocean front properties. Vigorous efforts have been made to build a seawall or other structure capable of restraining the oceans to keep them in the areas which they previously occupied. Due to the tremendous forces exerted by periodic severe storms to augment the tidal forces these structures have been unable to withstand the severe loads imposed on them, and a a result substantial additional beach areas have been lost.

FIELD OF THE INVENTION

Many efforts have been made to restrain the oceans but to no avail. We have succeeded in devising a system whereby we simulate the natural conditions that occur as the tidal and other waves come rolling in, but in an area further out thereby enabling us to provide a wider beach in the foreshore area to provide a margin of safety to withstand the tremendous loads that are exerted when periodic storms do come.

SUMMARY OF THE INVENTION

We provide a so-called sea-lift construction wherein we position in the submarine beach area, that is the area that is beyond the foreshore area and the trough and bar areas, a laterally continuous resilient triangular construction to slow down the water in the submarine beach area and to simulate the previous conditions in the foreshore area where the land elevation at the end of the low tide area and the beginning of the high tide area rises above the elevation of the low tide area to define the beginning of the high tide area.

The resilient sea-lift construction slows down the incoming elliptical wave formations by compressing the bottom of the elliptical wave configuration whereupon the wave drops a portion of the sand and sediment it is carrying and the backward movement of the bottom of the elliptical wave forces the ground area at the top of the sea-lift triangular construction to form new trough and bar configurations on the ocean side of sea-lift as the waves are forced upwardly by the gradual elevation of sea-lift thereby initiating the formation of a new shore line in the low tide area.

DESCRIPTION OF THE PREFERRED EMBODIMENT

Figure 1:
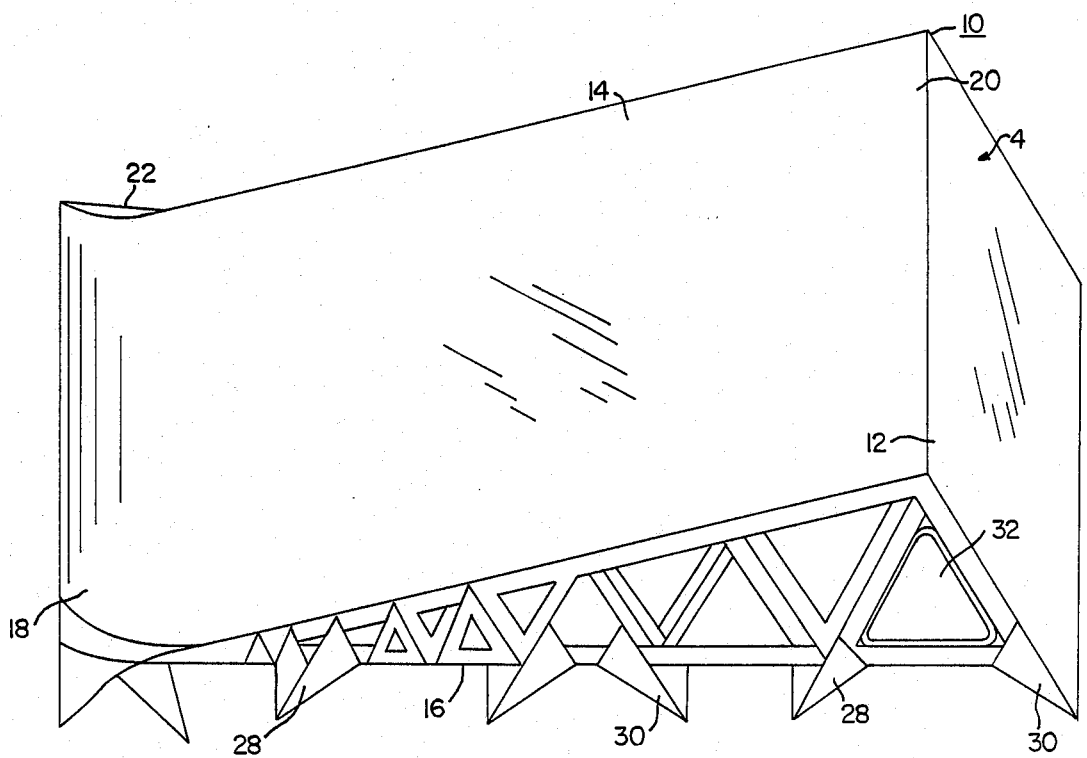
FIG. 1 is a perspective view of a Triangular Resilient Sea Lift module embodying our invention.

Referring now to FIG. 1, a module 10 of sea-lift is illustrated for use as a shoreline breakwater for placement in coastal waters. In use a plurality of modules 10 are placed in a side by side continuous relation.

The modules 10 are triangular in shape and preferably are formed of rubber of a medium hard durometer. The modules 10 are triangular in shape, having a base 12, a side face 14 and a hypotenuse 16.

The hypotenuse 16 being the larger area provides the support for the module and is positioned on the bottom of the coastal waters.

A plurality of spaced forwardly inclined transversely extending anchoring fins 28, and a plurality of spaced rearwardly inclined transversely extending anchoring fins 30 are provided to become embedded in the coastal sea bottom to securely anchor the module 10 against forward or rearward movement.

The modules 10 are cored out to conserve material as illustrated at 32. If desired to assist in anchoring the modules 10 to the floor of the coastal waters the cored out spaces 32 can be filled with ballast such for example as chopped up tire segments, which heretofore have proven to be compatable for use in salt water, and are used extensively in the formation of modules to attract fish.

Figure 2:
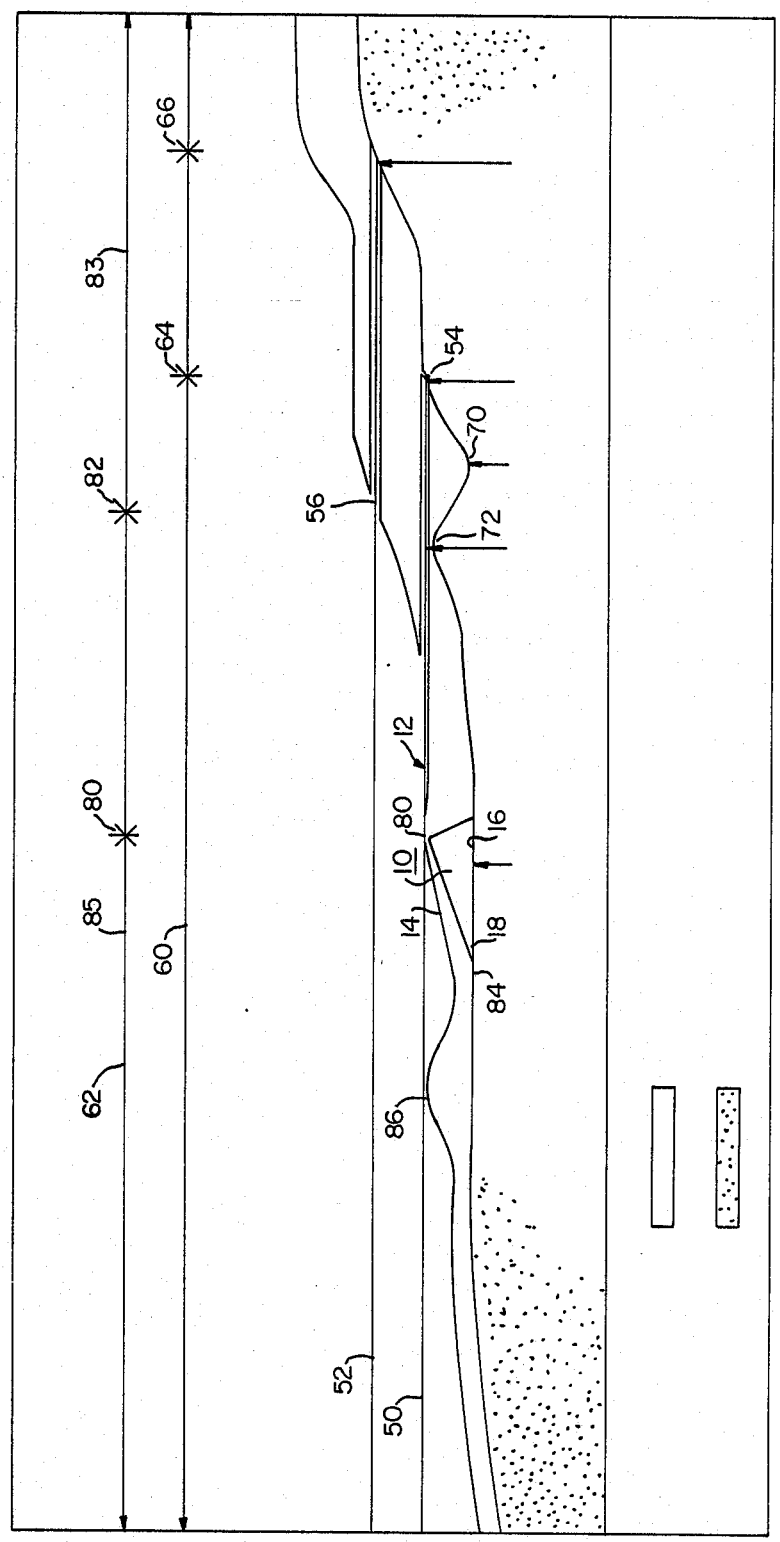
FIG. 2 is a diagrammatic view illustrating the placement of the modules of Sea-Lift at the juncture of the new Foreshore area and the new Submarine Beach area.

The side faces 14 of the modules 10 are thus the tops of the modules and are positions in the coastal waters with the lower end 18 positioned forwardly toward the open sea, and the higher end 20 positioned toward the shore. The forward end 18 thus receives the tidal flow of an incoming tide first. The forward end of the face 14 is preferably angled upwardly as illustrated at 22 to insure a gradual picking up of the tidal wave as the tide sweeps in. The tidal wave is slowed down as it climbs the elevation of the face 14, and a a result a degree of turbulence is encountered due in part to the push or rush of the incoming tide from behind. This results in a degree of turbulence which results in the formation of a new trough 84 at the face and in front of the modules 10 and the settling out of the solids as shown in FIG. 2 which results in the formation of a new bar 86 in front of the new trough 84.

The modules 10 may be of any suitable size, dependent on the degree of the tides encountered. For what might be referred to as a normal tide ranging from approximately two to three feet of elevation the modules 10 may be approximately fourteen feet long at the hypotenuse 16 and approximately six feet high at the base 12. Such modules are appropriate for use in water ranging from approximately five feet to seven feet deep.

In the operation of sea-lift the incoming tide climbs the face 14 of the module 10 and slows down as a result of the rush of the tide from behind a degree of disturbance occurs whereupon a new trough 84 is formed slightly forwardly of the angled up forward end 22 of the face 14 of the modules 10. The solids stirred up from the turbulence in the trough 84 and any solids being carried in the tide water will settle out on the new bar formation 86.

The rising tide overflows the top of the modules 10 and flows on towards the beach. The spent waves as they run up on the beach turn and flow back towards the sea. There is thus a considerable degree of turbulence where sand and other solids are picked up and are carried back towards the breakwater modules 10. The returning water slows down as the base 12 of the modules 10 are encountered and the solids being carried in the water are dropped and cause a building up of the elevation of the area forwardly of the modules 10 on the beach side. This build up becomes quite high, and if desired earth moving equipment such as a light bulldozer or a tractor equipped with a scraper can be employed to move this built up material further inland, whereupon additional material will be added by the operation of the tide. It is thus possible to build up the beaches to a very substantial degree such for example as ten to fifteen feet if desired.

As shown in FIG. 2 the condition of the beach elevation before and after the installation of sea-lift is illustrated. The low tide elevation is shown at 50 and the high tide elevation is illustrated at 52. Before the installation of sea-lift the low tide elevation on the beach is shown at 54 and the high tide elevation on the beach is shown at 56. The upper elevation lines 60 and 62 show the shore line conditions before and after the installation of sea-lift. As shown on the elevation line 60 the foreshore area extends from the low tide line 64 to the high tide line 66. The back beach thus extends from the high tide line 66 to the right as viewed in FIG. 2. The submarine beach area extends on the elevation line 60 to the left from the low tide line 64 of the foreshore area to 68. The location of the trough and bar elevations prior to the installation of sea-lift are shown at 70 and 72 respectively.

After installation of sea-lift the new low tide line shifts to the left as illustrated on the upper elevation line 62 and is in line with the apex of the modules 10 as shown at 80. The new foreshore area which extends from the new low tide line 80 to the new high tide line 82. It will be noted that the new back shore area 83 has been greatly increased, and extends to the right from the new high tide line 82. The new submarine beach 85 thus extends from the new low tide line 80 to the left having been considerably increased toward the open sea area.

A new trough area 84 is formed adjacent the forward end 18 of the modules 10, and a new bar 86 is formed forwardly of the trough area as herein stated.

Figure 3:
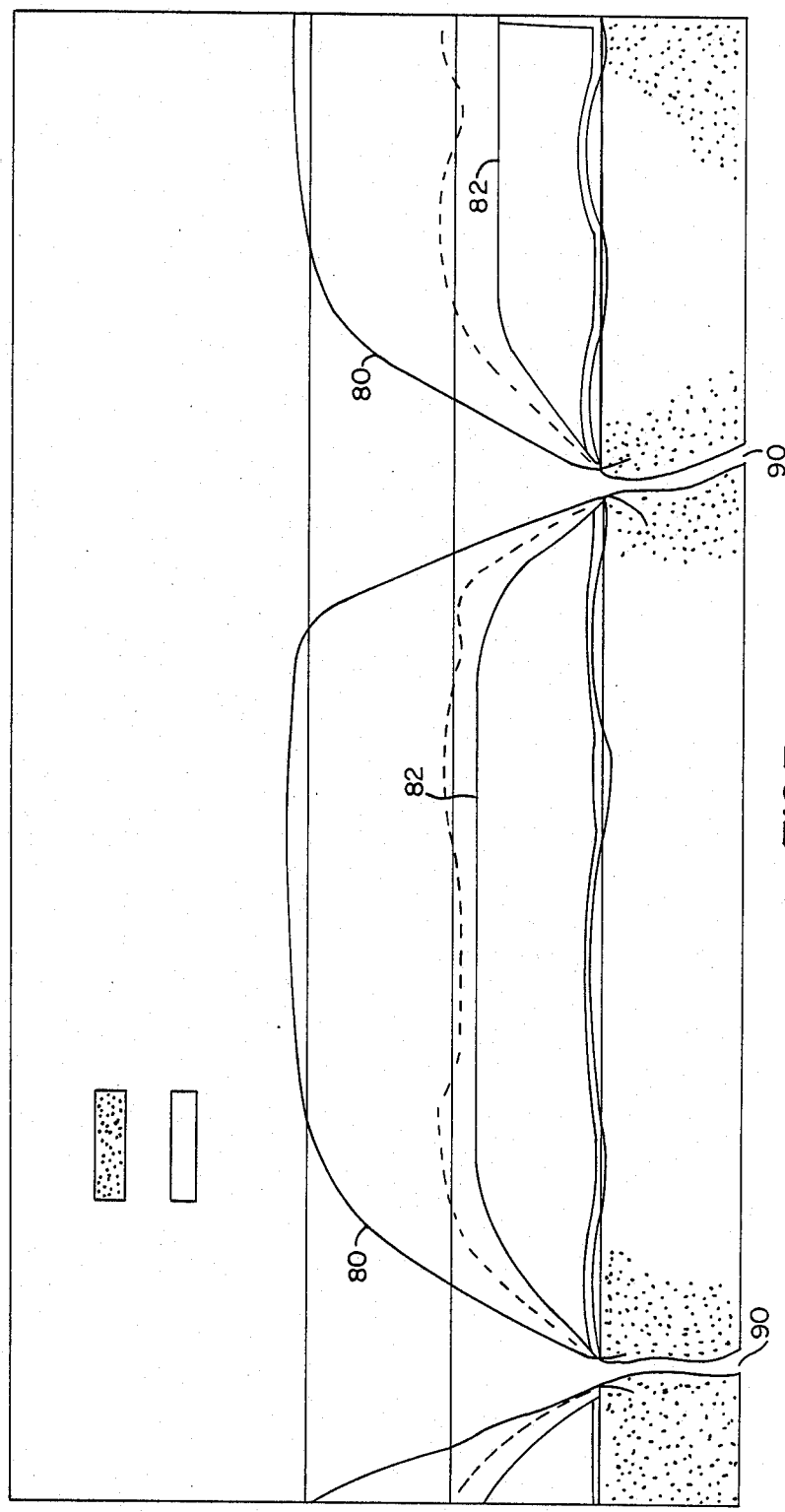
FIG. 3 is a plan view of the beach area showing how the placement of Sea-Lift is modified to accommodate rivers or canals.

Referring now to FIG. 3 the condition when a river or canal 90 flows into the ocean the new foreshore high and low tide lines 80 and 82 are deflected inwardly in long sweeping curves to keep the river or canal open. This is achieved by deflecting the aligned and contacting modules 10 to deflect inwardly while maintaining the desired elevation of the low tide line 54 to maintain the elevation of the peak 80 of the modules 10 by burying such of the modules 10 as is necessary to maintain the desired elevation and to prevent the undercutting of the approach of the river to the ocean.

Expressed another way in this phase of the development the structure begins shorebound of the high tide line at the junction of a river, canal, etc. The structure is buried shorebound of the low tide line to maintain the peak of the structure at an even height with the low tide line. The structure is placed out into the submarine beach and continues parallel along the shoreline to the next junction of a river, canal, etc. forming a lagoon.

We claim:

1. A resilient module for use as a shoreline breakwater for placement in coastal waters, the module being generally triangular in shape and having base side and hypotenuse faces, wherein the hypotenuse provides the supporting face of the module in the coastal waters, and the acute angled side provides a gradual inclination facing seaward, the module being placed in the coastal waters at the approximate depth of water at low tide corresponding with the approximate height of the base of the module.

2. The invention defined in claim 1 wherein a plurality of resilient modules are placed in contacting side by side relation.

3. The method of protecting a shoreline against erosion which comprises the steps of placing a series of resilient triangular modules, in side by side contacting relation in the submarine beach area defined as being the area beyond the foreshore area which includes (1) the high water line and (2) the low water line, and also beyond (3) the trough and (4) bar areas where the incoming waves encounter shallower water which disrupts the wave formation as the wave moves to higher ground to form (5) a new trough and (6) a new bar at a higher elevation beyond the trough due to the slowing down of the wave resulting in a release of solids, the resilient modules being placed in continuous side by side lateral contacting configuration in the submarine beach area where the water depth is approximately equal to or slightly greater than the height of the modules.

* * * * *